March 22, 1966     J D KINCHEN ETAL     3,242,148
NEUTRALIZATION IN HALOGENATED BUTYL RUBBER PRODUCTION
Filed Nov. 9, 1961
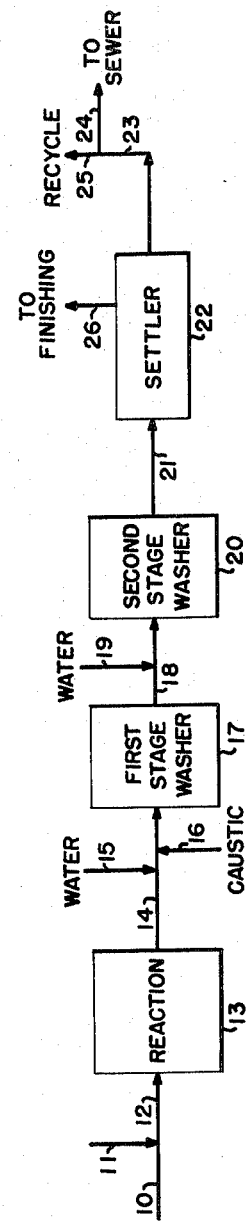
Frederick P. Lingamfelter
Duane W. Pugh     Inventors
J D Kinchen
By Robert D. Pearlman
Patent Attorney

United States Patent Office 3,242,148
Patented Mar. 22, 1966

3,242,148
NEUTRALIZATION IN HALOGENATED BUTYL RUBBER PRODUCTION
J D Kinchen, Frederick Phillips Lingamfelter, and Duane Wood Pugh, Baton Rouge, La., assignors to Esso Research and Engineering Company, a corporation of Delaware
Filed Nov. 9, 1961, Ser. No. 151,270
7 Claims. (Cl. 260—85.3)

The present invention deals with an improved method for halogenating isoolefin-multiolefin copolymers and recovering the resulting halogenated polymer. More particularly, it deals with improved means for neutralizing the effluent resulting from the halogenation of butyl rubber-type polymers.

Copolymers containing about 85 to 99.5 weight percent of a $C_4$ to $C_8$ isoolefin, e.g., isobutylene, 3-methyl-1-butene, and about 15 to 0.5 weight percent of a multiolefin of about 4 to 14 carbon atoms, e.g., myrcene, isoprene, butadiene, etc., are well-known in the literature as "butyl rubber." For example, see "Synthetic Rubber," G. S. Whitby (1954), and U.S. Patent 2,356,129 among many other references. Halogenated butyl rubber-type copolymers are produced by halogenating the butyl rubber polymer in a manner which does not substantially degrade its molecular weight while however giving a rubbery product of significantly different properties than the unhalogenated material. Butyl rubber may be halogenated at a temperature of —50 to 200° C., preferably 0 to 100° C., and at a pressure of 0.5 to 900 p.s.i.a. with suitable halogenating agents such as gaseous chlorine, liquid bromine, iodine monochloride, sulfural chloride, N-chlorosuccinimide, and the like. Halogenation is carried out by dissolving butyl rubber in a $C_5$ to $C_{10}$ hydrocarbon such as hexane, benzene, pentane, heptane etc., and then contacting the solution of butyl rubber with the above halogenating agents. The degree of halogenation is carefully regulated so that the halogenated copolymer contains at least 0.5 weight percent of combined halogen but not more than 1 atom of combined fluorine or chlorine per double bond in the polymer, nor more than 3 atoms of combined bromine or iodine per double bond. A more detailed description of the formation of, in particular, chlorinated butyl rubber may be had by referring to co-assigned U.S. Patent 2,944,578. The halogenated copolymer thus produced has a viscosity average molecular weight of about 100,000 to 2,000,000 and a mol percent unsaturation of about 0.1 to 20, preferably less than 10. As hereinafter employed in the specification, the term "halogenated butyl rubber" denotes the above described halogenated copolymer of a major portion of a $C_4$ to $C_8$ isoolefin and a minor portion of a $C_4$ to $C_{14}$ multiolefin.

Heretofore it has been conventional practice to first neutralize the halogenated butyl rubber effluent of the reaction zone prior to recovering the halogenated polymer itself. The polymer may be recovered by precipitation with a nonsolvent at about 0 to 180° C., spray drying, flashing off the hydrocarbon solvent by injection into a hot water bath, simply by use of a flash zone, etc. The conventional neutralization step involved adding water and caustic to the reaction zone effluent so as to neutralize the unreacted halogenating material and/or products resulting therefrom, e.g., hydrogen chloride, hydrogen bromide, etc. This was done in a single wash stage employing a continuous water phase (excess of water), with the effluent thereafter being sent to a settling zone for separation of water from the polymer products. The neutralized solution of polymer products was then subjected to recovery by the above indicated methods.

While the above procedure has been generally effective, substantial corrosion of equipment downstream from the neutralization zone has occurred due to incomplete acid removal. Moreover, considerable time has been required in the settling zone for obtaining good separation between the water wash and the polymer cement layer.

In accordance with the present invention, means are now taught whereby the effluent of the butyl rubber halogenation zone is neutralized in a manner insuring more efficient neutralization and washing as well as quickest settling time. More particularly, the effluent of the reaction zone is contacted with caustic or other basic agents and sufficient water so that neutralization occurs in a first stage characterized by a continuous cement phase (as opposed to a continuous water phase). The partially washed cement-water emulsion is then passed to a second washing stage where an additional quantity of water is added so that the emulsion is converted from a continuous cement phase to a continuous water phase in the second contacting step. After washing the halogenated butyl rubber in the above manner, it may be sent to a settling zone for separation of the water phase which will contain the acidic impurities. The neutralized polymer solution is then sent to further product recovery, e.g., a flash zone for recovery of the solid polymer. It has been found that best neutralization occurs by neutralizing the reactor effluent under continuous cement phase conditions, and that the best conditions for settling the resulting neutralized emulsion occur by establishing a continuous water phase in the second stage wash facilities.

The term "continuous cement phase" denotes the physical state wherein the hydrocarbon diluent-halogenated polymer phase permeates the total emulsion of water, hydrocarbon diluent, halogenated butyl rubber, i.e., the water particles are surrounded by cement. The term "continuous water phase" denotes the condition wherein a single water phase system occurs.

In the first stage continuous cement phase water wash, approximately 0.10 to 1.5, preferably 0.25 to 0.75 volume, of water are employed per volume of cement (reaction hydrocarbon diluent, halogenated butyl rubber and halogenating agent) present. After neutralization occurs under the optimum conditions of the first stage zone, additional water, i.e., 0.2 to 2.0, preferably 0.5 to 1.0, volume of water per volume of original reactor effluent are added so as to form a continuous water phase. Both first and second stage washing may occur at a temperature of 45 to 200° F., preferably under ambient conditions. While contact times in each stage may vary from 0.1 to 10 minutes or more, the contact times in the continuous cement phase will usually vary from 0.1 to 1.0 minute, with the contact period in the continuous water phase generally being 0.1 to 0.7 minute.

The basic neutralizing agent employed may be of any of a wide variety of conventional materials. It may be sodium hydroxide, potassium hydroxide, ammonia, soda ash or potassium carbonate. The neutralizing agent is added in an amount sufficient to neutralize the acidic reaction products of the halogenation step. It will normally be added in an amount of about 0.7 to 1.5 mols of neutralizing agent per mol of halogen in the halogenation step, preferably being added in sufficient quantities to maintain the pH of the water phase in a settling zone following the second stage wash at a value between about 2 and 5.

The present improved means for effecting neutralization of halogenated butyl rubber effluent is to be clearly distinguished from simply using a multiple water wash procedure. In such cases the halogenation zone effluent is subjected merely to a series of continuous water phase contacting zones and thus the optimum results realized by the use of a continuous cement phase for best neutralization followed by a continuous water phase for best settling are not obtained.

The various aspects and modifications of the present invention will be made more clearly apparent by reference to the following examples, drawing, and accompanying description.

Referring first to the drawing, illustrated therein is a halogenated butyl rubber production system characterized by the neutralization procedures of the present invention. As is conventional, a butyl rubber cement (hydrocarbon solution) containing about 10 to 18 weight percent of polymer solids in hexane solution flowing through line 10 is contacted with an excess quantity of a halogenating agent. For the purposes of illustration, about 3.5 pounds of chlorine gas is introduced through line 11 per pound of polymer solids present in the hydrocarbon solution flowing through line 10. The butyl rubber copolymer employed is a copolymer of 97.8% isobutylene and 2.2% isoprene. The resulting mixture of materials is then passed to reaction zone 13 by means of line 12. Reaction zone 13 may be one or more reactor vessels with halogenation being effected at a temperature of about 35° C. for a period of 0.3 hour under pressure of 30 p.s.i.g. The resulting solution of halogenated butyl rubber containing dissolved acidic impurities, such as hydrogen chloride, is then subjected to neutralization in accordance with the present invention.

The effluent of reaction zone 13 (line 14) is then contacted with about 0.5 volume of water per volume of effluent, the water generally being introduced by line 15 prior to mixing in first stage washer zone 17. A basic neutralization agent, e.g., sodium hydroxide, is added by means of line 16 in sufficient amounts to neutralize the acidic impurities present in the reaction zone effluent stream. In the present example about 0.022 pound of sodium hydroxide is added per pound of halogenated butyl rubber.

The resulting admixture is then passed to first stage washing zone 17 which is characterized by the presence of a continuous hydrocarbon-cement phase. First stage washer 17 may be any of a wide variety of contacting zones and generally will contain agitation means, e.g., mechanical mixer or the like, for insuring good mixing throughout. The partially washed water-cement emulsion is then passed via line 18 to a second washing stage 20.

Sufficient water is injected by means of line 19, e.g. 0.75 volume of water per volume of original cement, so that second stage washing zone 20 is characterized by the presence of a continuous water phase. After a residence time of about 0.21 minute, the emulsion is passed to settling zone 22 via conduit 21. Due to the presence of a continuous water phase in the emulsion sent to the settler, rapid settling occurs with an acidic impurity-rich water phase being withdrawn from the bottom of the settler and the neutralized, washed, halogenated polymer-hydrocarbon diluent being recovered from the upper portion of the settler. The acidic water phase removed via line 23 may be sent to a sewer or the like via line 24 or, as is preferable, a portion thereof is recycled via conduit 25 to the first or second stage washing zone for further use in extracting acidic impurities. The washed solution of halogenated butyl rubber in hydrocarbon diluent recovered via line 26 may then be sent to any of a variety of conventional polymer recovery procedures such as flashing for removal of hydrocarbon diluent followed by hot air or extrusion drying.

In order to further illustrate the important advantages offered in accordance with the present invention, the following experiments will be described. In all of the following studies the effluent from a butyl rubber halogenation zone wherein a butyl rubber copolymer of 97.8 weight percent of isobutylene and 2.2 weight percent of isoprene had been halogenated with chlorine gas was employed. The polymer was in the form of a 15 weight percent solution in hexane hydrocarbon diluent with halogenation taking place at about 95° F.

*Example 1*

A sample of the above indicated halogenation zone effluent was contacted with varying amounts of water as is indicated in Table I. The water/cement ratio was thus varied from a continuous water phase to a continuous cement phase. After mixing, the sample was allowed to settle into two phases and the pH of the water phase was measured. Distilled water was added to the cement phase and it was agitated and settled. The pH of the water extract from the cement phase was then also measured. The results are set forth in Table I.

TABLE I

| Run No. | Vol. H₂O/Vol. Cement | pH | | Contin. Phase |
|---|---|---|---|---|
| | | Cement Phase | Water Phase | |
| 1 | 2.8/1.0 | 2.9 | 3.3 | Water. |
| 2 | 2.2/1.0 | 2.7 | 3.2 | |
| 3 | 1.4/1.0 | 2.6 | 2.4 | |
| 4 | 0.72/1.0 | 2.8 | 1.6 | Cement. |

As shown in Table I, the pH of the water phase extract continues to fall as the volume ratio of water to cement was reduced. This indicates that more acid was being washed from the cement into the water when the cement phase predominated. It was thus seen that best cement washing occurs in a continuous cement phase.

*Example 2*

Another sample of halogenation zone effluent having the hydrogen chloride content indicated in Table II was subjected to a single neutralization-washing step using the amount of water indicated in Table II in combination with 10 weight percent sodium hydroxide based on about 1 mol NaOH/mol chlorine treat gas.

In a second study, halogenation zone effluent was subjected to the practice of the present invention. In a first stage the reaction zone effluent was contacted with 0.5 volume of water per volume of cement and 10 weight percent sodium hydroxide based on about 1 mol NaOH/mol chlorine treat gas. After agitation for a period of 0.26 minute the effluent of the first stage was contacted with an additional quantity of water so as to have an ultimate volume ratio of water to cement of 1.0 in the second stage.

Neutralization efficiency as measured by the amount of acid removed per amount initially present in the halogenation zone effluent was determined in both cases.

TABLE II.—ONE STAGE NEUTRALIZATION—CONTINUOUS CEMENT PHASE

| HCl in Reaction Effluent, Wt. percent | HCl in Washing Zone Outlet, Wt. percent | Vol. H₂O/ Vol. Cement | Neutralization Efficiency, percent |
|---|---|---|---|
| 0.298 | 0.049 | 0.5 | 83.6 |
| 0.287 | 0.056 | 0.5 | 80.3 |

TABLE III

[Present invention—1st stage—Continuous cement phase. 2nd stage—Continuous water phase]

| Vol. H₂O/Vol. Cement, 1st Stg. Wash | Vol. H₂O/Vol. Cement, 2d Stg. Wash | HCl Content of Cement after Chlorination, Wt. percent | HCl Content of Cement after 2d Stg. Wash and Settling | Percent Neutralization Efficiency |
|---|---|---|---|---|
| 0.5 | 1.0 | 0.124 | 0.007 | 94.4 |
| 0.5 | 1.0 | 0.121 | 0.007 | 94.3 |

As shown in Tables II and III, the practice of the present invention provided a neutralization efficiency of over 10% greater than that obtained by conventional one-stage neutralization operation. By initially neutralizing the halogenation zone effluent in a first stage continuous cement operation and then adding further water so as to form a continuous water phase in a second stage wash, the neutralized halogenated polymer will contain less acidic impurities.

*Example 3*

In order to illustrate the importance of a second stage continuous water phase washing step as a means of obtaining rapid settling between neutralized polymer solution and the water wash, the following series of tests are described.

Two examples of a typical halogenation zone reactor effluent stream were treated with different quantities of water so as to obtain in one case a continuous cement phase and in the second case a continuous water phase. After subjecting the resulting emulsions to mixing for a period of 0.8 minute, they were allowed to settle and the time required to obtain complete settling was evaluated. The results are illustrated in Table IV.

TABLE IV

[(A) Static settling data—Vol. ratio cement/vol. ratio H₂O>1.0. Sample size—233 cc. vol. cement/vol. H₂O=129/104=1.24]

| Time, Min. | H₂O, cc. | Interphase, cc. | Cement, cc. |
|---|---|---|---|
| 1 | 36 | ---- | 197 |
| 5 | 55 | 105 | 73 |
| 10 | 93 | 15 | 125 |
| 15 | 104 | 0 | 129 |

Settling complete after 15 minutes.

[(B) Static settling data—Vol. ratio cement/vol. ratio H₂O<1.0. Sample size—1,600 cc. vol. cement/vol. H₂O=760/840=0.905]

| Time, Min. | H₂O, cc. | Cement, cc. |
|---|---|---|
| 0.5 | 740 | 860 |
| 1.0 | 840 | 760 |
| 1.5 | 840 | 760 |
| 2.0 | 840 | 760 |

Settling essentially complete after 1.5 minutes. No interphase observed.

As shown in Table IV, best settling between the washed hydrocarbon and the aqueous neutralization medium occurs when the water phase of the emulsion is continuous, i.e., the volume ratio of cement to water is low. Thus, the example further indicates the desirability of employing the present two-step process as a means of obtaining highly efficient neutralization and rapid settling.

Various modifications may be made to the present invention. For example, either one or both of the washing stages described, i.e., continuous cement phase followed by continuous water phase, may actually be a plurality of stages having the necessary liquid phase conditions. Additionally, the same procedure can be used for extracting, washing, leaching, etc., impurities from viscous mediums. This provides efficient removal with minimum equipment.

Having described the present invention, that which is sought to be protected is set forth in the following claims.

What is claimed is:

1. In a process for the manufacture of a halogenated rubbery copolymer of about 85 to 99.5 weight percent of a $C_4$ to $C_8$ isoolefin and about 15 to 0.5 weight percent of a $C_4$ to $C_{10}$ multiolefin, in which the rubbery copolymer is dissolved in a $C_5$ to $C_{10}$ hydrocarbon diluent and contacted with a halogenating agent in a halogenation zone, and wherein the resulting halogenated polymer in hydrocarbon diluent is contacted with a basic medium in order to neutralize acidic impurities, the improvement which comprises initially contacting the halogenation zone effluent with a basic reagent and sufficient quantities of water so as to neutralize the reaction zone effluent under conditions of a continuous cement phase, thereafter adding additional aqueous medium so as to convert the thus treated halogenation zone effluent into a continuous water phase, allowing the resultant admixture to settle and recovering a polymer-rich hydrocarbon portion depleted in acidic impurities.

2. The improvement of claim 1 wherein said halogenation zone effluent is initially contacted with 0.25 to 0.75 volume of water per volume of hydrocarbon-halogenated polymer cement so as to maintain said initial continuous cement phase, and wherein thereafter 0.5 to 1.0 volume of water per volume of original cement is additionally added so as to form said continuous water phase.

3. The improvement of claim 1 wherein said copolymer is halogenated with gaseous chlorine and said acidic impurities are largely hydrogen chloride.

4. The improvement of claim 1 wherein said initial continuous cement phase is subjected to agitation prior to passage to said second stage wherein further quantities of aqueous medium are added in order to obtain a continuous water phase.

5. The improvement of claim 1 wherein said continuous cement phase is maintained for a period of about 0.1 to 10 minutes, and said continuous water phase is maintained for a period of 0.1 to 10 minutes.

6. In a process for the manufacture of chlorinated rubbery copolymer of 85 to 99.5 weight percent of a $C_4$ to $C_8$ isoolefin and about 15 to 0.5 weight percent of a $C_4$ to $C_{14}$ multiolefin, wherein the unhalogenated rubbery copolymer dissolved in a $C_5$ to $C_{10}$ hydrocarbon solvent is contacted in a reaction zone with gaseous chlorine at a temperature between 0° to 100° C. to form a chlorinated copolymer, and wherein the effluent of said reaction zone containing acidic impurities is contacted with a basic reagent to neutralize and remove said impurities, the improvement which comprises initially contacting said reaction zone with a basic reagent and 0.25 to 0.75 volume of water per volume of reaction zone effluent so as to maintain a continuous cement phase, agitating the resulting admixture, thereafter adding 0.5 to 1.0 volume of additional water per volume of original reaction zone effluent in order to form a continuous water phase system, allowing the admixture to settle and recovering a halogenated polymer-hydrocarbon diluent stream reduced in acidic impurities.

7. In a process for the manufacture of brominated rubbery copolymer of 85 to 99.5 weight percent of a $C_4$ to $C_8$ isoolefin and about 15 to 0.5 weight percent of a $C_4$ to $C_{14}$ multiolefin, wherein the unhalogenated rubbery copolymer dissolved in a $C_5$ to $C_{10}$ hydrocarbon solvent is contacted in a reaction zone with liquid bromine at a temperature between 0° and 100° C. to form a brominated copolymer, and wherein the effluent of said reaction zone containing acidic impurities is contacted with a basic reagent to neutralize and remove said impurities, the improvement which comprises initially contacting said reaction zone with a basic reagent and 0.25 to 0.75 volume of water per volume of reaction zone effluent so as to maintain a continuous cement phase, agitating the resulting admixture, thereafter adding 0.5 to 1.0 volume of additional water per volume of original reaction zone effluent in order to form a continuous water phase system, allowing the admixture to settle and recovering a halogenated polymer-hydrocarbon diluent stream reduced in acidic impurities.

References Cited by the Examiner
UNITED STATES PATENTS

| | | | |
|---|---|---|---|
| 2,631,984 | 3/1953 | Crawford et al. | 260—96 |
| 2,716,669 | 8/1955 | Fravel | 260—94.7 |
| 3,099,644 | 7/1963 | Parker et al. | 260—85.3 |

JOSEPH L. SCHOFER, *Primary Examiner.*

WILLIAM H. SHORT, *Examiner.*